US012663316B2

(12) United States Patent
Hong

(10) Patent No.: US 12,663,316 B2
(45) Date of Patent: Jun. 23, 2026

(54) TEMPERATURE SENSOR ASSEMBLY, TEMPERATURE SENSING SYSTEM AND METHOD FOR USING THE SAME

(71) Applicant: Aktiebolaget SKF, Gothenburg (SE)

(72) Inventor: Zhichao Hong, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 617 days.

(21) Appl. No.: 17/981,543

(22) Filed: Nov. 7, 2022

(65) Prior Publication Data

US 2023/0168129 A1    Jun. 1, 2023

(30) Foreign Application Priority Data

Dec. 1, 2021    (CN) .......................... 202111451339.X

(51) Int. Cl.
    *G01K 1/024*        (2021.01)
    *G01K 1/08*         (2021.01)
    *G01K 1/16*         (2006.01)
(52) U.S. Cl.
    CPC ............... *G01K 1/024* (2013.01); *G01K 1/08* (2013.01); *G01K 1/16* (2013.01)

(58) Field of Classification Search
    CPC ............ G01K 1/08; G01K 1/16; G01K 13/00; G01K 13/08
    See application file for complete search history.

(56) References Cited

U.S. PATENT DOCUMENTS

| | | | |
|---|---|---|---|
| 2021/0048317 A1* | 2/2021 | Slama | ..................... G01D 5/145 |
| 2021/0173020 A1* | 6/2021 | Darrah | ..................... G01P 15/14 |
| 2021/0176318 A1* | 6/2021 | Darrah | ..................... G01R 33/07 |
| 2021/0181226 A1* | 6/2021 | Toivanen | .................. G01P 1/02 |

\* cited by examiner

*Primary Examiner* — Sisay Yacob
(74) *Attorney, Agent, or Firm* — GARCIA-ZAMOR INTELLECTUAL PROPERTY LAW, LLC; Ruy Garcia-Zamor; Bryan Peckjian

(57) ABSTRACT

The invention provides a temperature sensor assembly, including: a housing, having a heat transmission portion for directly connecting with a component to be sensed and receiving heat from the component to be sensed; a temperature sensor, disposed in the housing and connected with the heat transmission portion to receive heat from the heat transmission portion; a short-distance wireless communication device, communicatively connected with the temperature sensor, to receive a sensing signal from the temperature sensor and transmit a first output signal corresponding to the sensing signal. Furthermore, the invention also provides a temperature sensing system and a method for using the same.

14 Claims, 1 Drawing Sheet

TEMPERATURE SENSOR ASSEMBLY, TEMPERATURE SENSING SYSTEM AND METHOD FOR USING THE SAME

CROSS-REFERENCE TO RELATED APPLICATIONS

This application claims priority to Chinese Patent Application no. 202111451339.X, filed Dec. 1, 2021, the contents of which is fully incorporated herein by reference.

TECHNICAL FIELD

The invention relates to a temperature sensor assembly, a temperature sensing system and a method for using the same.

BACKGROUND

Sensors are usually used to sense physical quantity of interest for various components or structures, and output the sensed data. However, common sensors usually need to transmit the sensed data through cables or wires. For some applications, such as wheels, axles, bearings and stators of trains and subway trains, the temperature data plays an important role in the operation of the equipment. However, due to limitation of space conditions and specific working conditions, it is usually impossible to use sensors connected by cables or wires to sense the temperature data, or even if such temperature sensors are installed, they are far away from the components to be sensed, so that accurate temperature signals cannot be obtained.

SUMMARY

In view of this, the present invention provides a temperature sensor assembly, comprising: a housing, having a heat transmission portion for directly connecting with a component to be sensed and receiving heat from the component to be sensed; a temperature sensor, disposed in the housing and connected with the heat transmission portion to receive heat from the heat transmission portion; a short-distance wireless communication device, communicatively connected with the temperature sensor, to receive a sensing signal from the temperature sensor and transmit a first output signal corresponding to the sensing signal.

Further, the invention also provides a temperature sensing system, which comprises the temperature sensor assembly as described above; a long-distance wireless communication module, disposed in the signal coverage range of the short-distance wireless communication device of the temperature sensor assembly, receiving a first output signal from the short-distance wireless communication device and transmitting a second output signal corresponding to the first output signal to a remote computing device.

Further, the present invention also provides a method for using a temperature sensing system, which is the above-mentioned temperature sensing system, and the method comprises: directly connecting the heat transmission portion of the temperature sensor assembly with a component included in a power machine or a vehicle moving relative to the ground, and the component serves as the component to be sensed; disposing the long-distance wireless communication module on the power machine or vehicle and locating the long-distance wireless communication module in the signal coverage range of the short-distance wireless communication device.

The temperature sensor assembly and the temperature sensing system integrate the short-distance wireless communication technology, eliminating the data cable used by the traditional temperature sensor. Besides, the temperature sensor assembly is small in size and convenient to install, and can be widely used in the scenarios of limited installation space, inconvenient wiring and bad working conditions of mining machine, trains and subway trains or the like.

DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings.

DETAILED EMBODIMENTS

Figure 1:
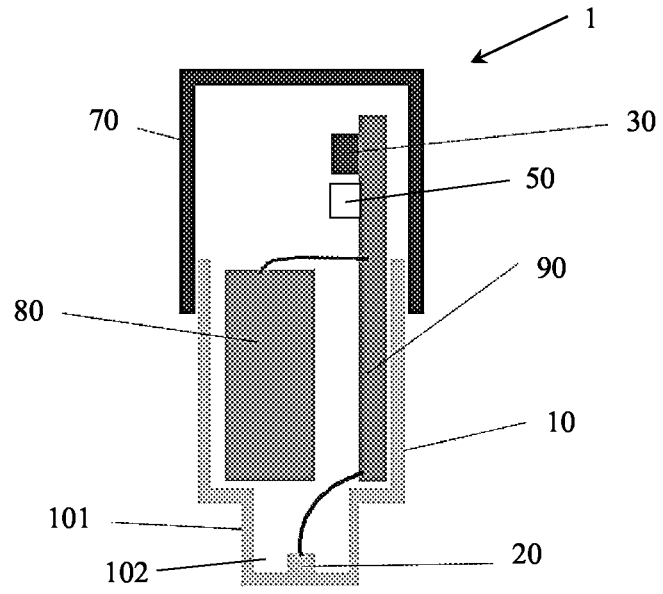
FIG. 1 is a schematic diagram of a preferred embodiment of a sensor assembly according to the present invention.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The present invention provides a temperature sensor assembly, referring to FIGS. 1-2. The temperature sensor assembly 1 includes: a housing 10, having a heat transmission portion 101 for directly connecting with a component to be sensed and receiving heat from the component to be sensed; a temperature sensor 20, disposed in the housing 10 and connected to the heat transmission portion 101 to receive heat from the heat transmission portion; a short-distance wireless communication device 30, communicatively connected with the temperature sensor 20 to receive a sensing signal from the temperature sensor 20, and to transmit a first output signal S1 corresponding to the sensing signal, for example, according to a short-distance wireless communication protocol.

The temperature sensor assembly of the present invention is especially suitable for the component to be sensed that cannot use the traditional wired sensor and have limited installation space, especially for the components whose temperature needs to be sensed in power machine or vehicles that move relative to the ground, such as trains, subway trains, mining machine and even ships. Taking vehicles such as trains and subway trains as an example, the component to be sensed include, but are not limited to, related components such as wheels, axles, bearings, stators and the like. In this application scenario, due to the numerous equipment and limited internal space of this kind of vehicles, it is usually impossible to set temperature sensors for related equipment or components. If the conventional temperature sensors that transmit data through wires are adopted, there will also be difficulties in installation, wiring, signal acquisition and other aspects of the temperature sensors, and even bring potential safety risks.

Therefore, the temperature sensor assembly of the present invention combines the temperature sensor with the short-distance wireless communication technology, can perform temperature sensing for various component to be sensed, and send out the temperature sensing results in a short-distance wireless communication mode, thus avoiding the cables and the like needed by traditional sensors for transmitting the sensing results. The temperature sensor assembly is small in size and convenient to install, and can be applied to various scenarios where the traditional wired temperature sensors cannot be competent.

Further preferably, the heat transmission portion 101 can be formed with a cavity 102, and the temperature sensor 20 is, for example, disposed in the cavity 102 and connected with the inner wall of the cavity 102 in a heat transmission manner. The heat transmission portion 101 can be formed of a metal material with good heat transmission capability, such as steel. In the embodiment shown in FIGS. 1-2, the temperature sensor 20 is installed against the bottom wall of the cavity 102, and the temperature sensor assembly 1 is installed above the bearing housing, so that the temperature sensor 20 installed on the bottom wall can be closer to the bearing that generates heat. In other cases, for example, when the temperature sensor assembly is installed at other positions of the component to be sensed, the position of the temperature sensor 20 can be appropriately adjusted, for example, it can be installed at the side wall as long as it can be closer to the heat generating part. It should be understood that the temperature sensor 20 can be directly connected to the inner wall of the cavity 102 by adhesion, welding, snap connection, screw connection, etc., so as to minimize the attenuation of the temperature signal.

According to a further improvement, the inner wall of the cavity 102 may further include a groove (not shown), which may be filled with a thermal conductive substance (such as heat conducting glue), which at least partially surrounds and contacts the temperature sensor 20, so as to ensure not only the stable installation of the temperature sensor 20 but also the heat transmission.

According to a further preferred embodiment, the heat transmission portion 101 may also be formed with a thread (not shown) provided on the outer wall of the cavity 102, which can be connected by screwing with the component to be sensed. For example, in the embodiment of FIG. 2, the temperature sensor assembly 1 is screwed to the component 40 to be sensed through the thread at the heat transmission portion 101. According to this embodiment, the heat transmission portion 101 can be formed in a cylindrical shape, and a thread is formed on the outer wall of the cylindrical heat transmission portion 101, so that the heat transmission portion 101 can be screwed to the component 40 to be sensed (for example, it can be a bearing housing), so as to ensure that the temperature sensor assembly is close to the heat generating part.

According to other improvements of the present invention, the temperature sensor assembly further includes a cover 70, which can be made of non-metallic materials (e.g., resin, plastic, rubber, etc.) and is hermetically connected with the housing 10 (e.g., by screw connection). Specifically, when the heat transmission portion 101 is made of metal capable of heat transmission, the cover 70 made of nonmetal can ensure that the signal of the short-distance wireless communication device 30 can be transmitted smoothly.

Further preferably, the temperature sensor assembly 1 may further include a battery 80, which may be implemented as a wireless rechargeable battery, for example, to provide power for short-distance wireless communication devices and other power consuming components. In addition, the electrical devices (temperature sensor 20, short-distance wireless communication device 30, etc.) of the temperature sensor assembly 1 can be installed on the same PCB board 90.

Further preferably, the temperature sensor assembly 1 may further include a control means 50 that receives an on/off signal from the outside of the sensor assembly 1 to control the on and off status of the sensor assembly. The on/off signal can be, for example, manual operation, radio signal, optical signal, acoustic signal, etc. Accordingly, the control means 50 can be any suitable switching means, device, circuit, etc. responding to the on/off signal, or the control means 50 can be simply implemented as a timing switch to turn on/off the temperature sensor assembly 1 in a set time period. Furthermore, through the control means, the temperature sensor can be set to sense the temperature signal at a certain time interval, and the time interval can be set to any suitable range according to the actual needs, such as once every few hours, minutes, seconds, etc.

As mentioned above, due to the limitation of the installation space, the structural size of the temperature sensor assembly, etc., the short-distance wireless communication device 30 with a small footprint is selected, which can be one of RFID device, Bluetooth device, NFC device, ZigBee device and UWB device, for example. Therefore, the temperature sensor assembly according to the invention can realize temperature sensing and wireless transmission of the sensing results, and at the same time, it can ensure that its structural size is small enough to be suitable for occasions with limited installation space.

In addition, because the signal transmission range of the short-distance wireless communication device is limited, the present invention also provides a temperature sensing system, which can transmit the temperature sensing result to a further range.

Figure 2:
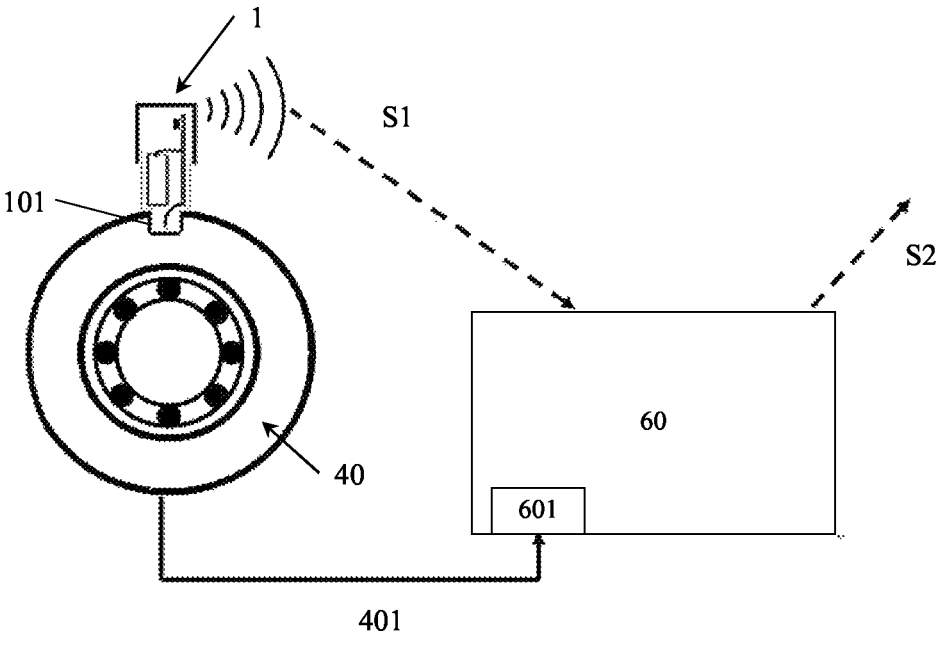
FIG. 2 is a schematic diagram of a preferred embodiment of a temperature sensing system according to the present invention.

According to another preferred embodiment shown in FIG. 2, the present invention also proposes a temperature sensing system, which includes the temperature sensor assembly 1 as described above and a remote wireless communication module 60. The long-distance wireless communication module 60 is set in the signal coverage area of the short-distance wireless communication device 30 of the temperature sensor assembly 1, and can be located at any suitable position (a suitable installation position can be set according to the applied component and its surrounding environment). The long-distance wireless communication module 60 receives the first output signal S1 from the short-distance wireless communication device 30, and transmits the second output signal S2 corresponding to the first output signal S1 to the remote computing device. Through the temperature sensing system, the temperature signal from the component to be sensed is sensed by the temperature sensor 20, and sent to the long-distance wireless communication module 60 through the short-distance wireless communication device 30 of the temperature sensor assembly 1, and the long-distance wireless communication module 60 sends the temperature signal to a remote computing device located at a farther distance.

Specifically, the long-distance wireless communication module 60 has a longer communication distance than the short-distance wireless communication device 30, and can be implemented in various ways, such as GMS module, CDMA module, 3G/4G/5G communication module, WiFi module, etc., so that the second output signal S2 can be sent to a remote computing device, including but not limited to a cloud computing device, a remote controller, a remote server, a remote database, a remote mobile computing device (e.g. a smart phone, a tablet, a notebook etc.)

This kind of temperature sensing system is more advantageous to be applied to motive machines or vehicles that move relative to the ground, such as trains and subway trains. For example, in the case of being installed on a train, the temperature sensor assembly 1 can be directly installed on the component to be sensed (for example, installed on the housing of the bearing assembly) and implemented as a Bluetooth module, for example, while the long-distance wireless communication module 60 can be installed at any suitable position on the train within the range of Bluetooth signals and can be implemented as a 5G communication module, as long as it can receive the Bluetooth signals from the temperature sensor assembly 1.

In another preferred embodiment not shown, the temperature sensing system may include at least one temperature sensor assembly and at least one remote wireless communication module. Furthermore, each remote wireless communication module can correspond to one or more temperature sensor assemblies, receive first output signals from the one or more temperature sensor assemblies, and transmit second output signals corresponding to each first output signal.

That is, each remote wireless communication module can be paired with a plurality of temperature sensor assemblies. In this case, the remote computing device can also control each remote wireless communication module separately, and then the corresponding temperature sensor assemblies can be controlled. Of course, there may be a case where a temperature sensor assembly is paired with a plurality of remote wireless communication modules, so that when one of the remote wireless communication modules fails, the other remote wireless communication modules can still ensure the long-distance transmission of the temperature sensing signal.

This temperature sensing system, which includes a plurality of temperature sensor assemblies and a plurality of remote communication modules, is especially suitable for the situation where there are a plurality of targets that need temperature sensing. Vehicles such as trains and subway trains include complex power systems, transmission systems, and many moving components (such as many shafts and bearing assemblies), and the space for arranging sensors is usually very limited. Therefore, a plurality of temperature sensor assemblies of the temperature sensor system can be disposed at a plurality of positions that needs temperature sensing (for example, at the respective housings of a plurality of bearing assemblies), and a remote wireless communication module(s) corresponding to the plurality of temperature sensor assemblies can be disposed at any suitable position in the signal coverage area of the plurality of temperature sensor assemblies, which can be far away from the component to be sensed in work. Thereby realizing multi-point temperature sensing and sensing result transmission in a limited space. In addition, when the temperature sensing system includes a plurality of remote wireless communication modules (each of which can correspond to a plurality of temperature sensor assemblies), the remote wireless modules can be relatively independent or can communicate with each other, and can be controlled by remote computing devices.

Preferably, as shown in FIG. 2, the remote wireless communication module 60 further includes a vibration sensor 601 and a vibration transmission structure 401 rigidly connected to the sensed target 40. The vibration transmission structure 401 can be any suitable mechanical structure for transmitting vibration, such as connecting rod, rope, etc. with certain rigidity. The vibration sensor 601 receives the vibration signal from the target 40 to be sensed through the vibration transmission structure 401, and the remote wireless communication module 60 can activate the temperature sensor assembly 1 according to the vibration signal.

For example, when the temperature sensing system is applied to the bearing assembly (as the component 40 to be sensed) of a vehicle such as a train or a subway train, when the vehicle is running, the bearing assembly will generate vibration, which will be transmitted to the vibration sensor 601 through the vibration transmission structure 401 and then to the long-distance wireless communication module 60. At this time, it can be considered that the temperature sensing system has sensed that the vehicle starts running. Then, the long-distance wireless communication module 60 sends an activation signal to the temperature sensor assembly 1, for example, the activation signal is used as the on/off signal as described above to wake up the control means 50 to activate the temperature sensor assembly 1. In addition, the vibration signal sensed by the vibration sensor 601 can also be sent to a remote computing device. The remote wireless communication module 60 may also include necessary switches, controllers, batteries, etc.

Furthermore, the invention also provides a method for using the temperature sensing system, which is especially suitable for the above-mentioned power machine or vehicles moving relative to the ground. The method comprises the following steps: directly connecting a heat transmission portion of a temperature sensor assembly with a component included in a power machine or a vehicle moving relative to the ground, and the component is used as the component to be sensed; a long-distance wireless communication module is disposed on the power machine or vehicle and located in the signal coverage range of the short-distance wireless communication device.

Further, it is preferable that the component to be sensed includes a heat generating part, and the position where the heat transmission portion of the temperature sensor assembly is directly connected with the component to be sensed is set close to the heat generating part. Specifically, taking a train or a subway train as an example, the component to be sensed can be a bearing assembly on the train or subway train, and the bearing generates a large amount of heat during its rotation. As the temperature sensor assembly can not be directly installed on the bearing itself, the temperature sensor assembly of the present invention can be installed on the shaft fixing end, housing, box cover, bracket, etc. of the bearing assembly, but it should be as close as possible to the heat generating part (i.e. the bearing). It should be understood that the term "close to (or as close as possible to)" here can be understood as approaching to or being close to the site where heat is generated when the installation space, installation means, installation conditions, etc. permit, so as to shorten the heat transmission path as much as possible to avoid excessive attenuation.

In addition, the above-mentioned direct connection between the heat transmission portion of the housing of the temperature sensor assembly and the component to be sensed means that the two are directly and physically connected, and there is no installation structure or member between them, so as to ensure that the temperature sensor assembly is close to the site where heat is generated, to obtain more accurate temperature signals.

The exemplary implementation of the scheme proposed in this disclosure has been described in detail above with reference to the preferable embodiments. However, it can be understood by those skilled in the art that without departing from the concept of this disclosure, various changes and modifications can be made to the above specific embodiments, and various technical features and structures proposed in this disclosure can be combined in various ways without exceeding the scope of protection of this disclosure, which is determined by the appended claims.

The invention claimed is:

1. A temperature sensor assembly, comprising:
a housing, having a heat transmission portion for directly connecting with a component to be sensed and receiving heat from the component to be sensed;
a temperature sensor, disposed in the housing and connected with the heat transmission portion to receive heat from the heat transmission portion;
a short-distance wireless communication device, communicatively connected with the temperature sensor, to receive a sensing signal from the temperature sensor and transmit a first output signal corresponding to the sensing signal;
a cover which is a separate component from the housing, the cover being hermetically sealed to the housing; and
a PCB board partially located within a first volume defined by the housing, the PCB board also including a portion that is located within a second volume defined as being both within the cover and outside of the first volume defined by the housing.

2. The temperature sensor assembly according to claim 1, wherein the heat transmission portion is formed to have a cavity, and the temperature sensor is disposed in the cavity and connected with the inner wall of the cavity in a heat transmission manner.

3. A temperature sensor assembly, comprising:
a housing, having a heat transmission portion for directly connecting with a component to be sensed and receiving heat from the component to be sensed;
a temperature sensor, disposed in the housing and connected with the heat transmission portion to receive heat from the heat transmission portion;
a short-distance wireless communication device, communicatively connected with the temperature sensor, to receive a sensing signal from the temperature sensor and transmit a first output signal corresponding to the sensing signal;
wherein the heat transmission portion is formed to have a cavity, and the temperature sensor is disposed in the cavity and connected with the inner wall of the cavity in a heat transmission manner; and
wherein the inner wall of the cavity comprises a groove, the temperature sensor is disposed in the groove, and the groove is filled with a heat conducting substance, which at least partially surrounds and contacts the temperature sensor.

4. A temperature sensor assembly, comprising:
a housing, having a heat transmission portion for directly connecting with a component to be sensed and receiving heat from the component to be sensed;
a temperature sensor, disposed in the housing and connected with the heat transmission portion to receive heat from the heat transmission portion;
a short-distance wireless communication device, communicatively connected with the temperature sensor, to receive a sensing signal from the temperature sensor and transmit a first output signal corresponding to the sensing signal;
wherein the heat transmission portion is formed to have a cavity, and the temperature sensor is disposed in the cavity and connected with the inner wall of the cavity in a heat transmission manner;
wherein the heat transmission portion is further formed to have a thread provided on the outer wall of the cavity, and the thread can be screwed with the component to be sensed.

5. The temperature sensor assembly according to claim 1, further comprising a control means that receives an on/off signal from the outside of the temperature sensor assembly, to control the on and off status of the temperature sensor assembly.

6. A temperature sensing system comprising:
a temperature sensor assembly according to claim 1;
a long-distance wireless communication module, disposed in the signal coverage range of the short-distance wireless communication device of the temperature sensor assembly, receiving a first output signal from the short-distance wireless communication device and transmitting a second output signal corresponding to the first output signal to a remote computing device.

7. The temperature sensing system as claimed in claim 6, wherein the temperature sensing system comprises at least one temperature sensor assembly and at least one remote wireless communication module,
wherein each remote wireless communication module corresponds to one or more temperature sensor assemblies, receives first output signals from the one or more temperature sensor assemblies, and transmits second output signals corresponding to each first output signal.

8. The temperature sensing system as claimed in claim 6, wherein the remote wireless communication module further comprises a vibration sensor and a vibration transmission structure rigidly connected with the target to be sensed,
wherein the vibration sensor receives the vibration signal from the target to be sensed through the vibration transmission structure, and the remote wireless communication module activates the temperature sensor assembly according to the vibration signal.

9. A method of using a temperature sensing system as claimed in claim 6, comprising:
directly connecting the heat transmission portion of the temperature sensor assembly with a component included in a power machine or a vehicle moving relative to the ground, and the component serves as the component to be sensed;

disposing the long-distance wireless communication module on the power machine or vehicle and locating the long-distance wireless communication module in the signal coverage range of the short-distance wireless communication device.

10. The method according to claim 9, wherein the component to be sensed includes a site where heat generates, the part where the heat transmission portion of the temperature sensor assembly is directly connected with the component to be sensed is set close to the site where heat generates.

11. A method of using a temperature sensing system as claimed in claim 7, comprising:

directly connecting the heat transmission portion of the temperature sensor assembly with a component included in a power machine or a vehicle moving relative to the ground, and the component serves as the component to be sensed;

disposing the long-distance wireless communication module on the power machine or vehicle and locating the long-distance wireless communication module in the signal coverage range of the short-distance wireless communication device.

12. A method of using a temperature sensing system as claimed in claim 8, comprising:

directly connecting the heat transmission portion of the temperature sensor assembly with a component included in a power machine or a vehicle moving relative to the ground, and the component serves as the component to be sensed;

disposing the long-distance wireless communication module on the power machine or vehicle and locating the long-distance wireless communication module in the signal coverage range of the short-distance wireless communication device.

13. The method according to claim 11, wherein the component to be sensed includes a site where heat generates, the part where the heat transmission portion of the temperature sensor assembly is directly connected with the component to be sensed is set close to the site where heat generates.

14. The method according to claim 12, wherein the component to be sensed includes a site where heat generates, the part where the heat transmission portion of the temperature sensor assembly is directly connected with the component to be sensed is set close to the site where heat generates.

* * * * *